May 27, 1941.  E. MAUTNER  2,243,432
AIRCRAFT
Filed Aug. 13, 1938  3 Sheets-Sheet 1
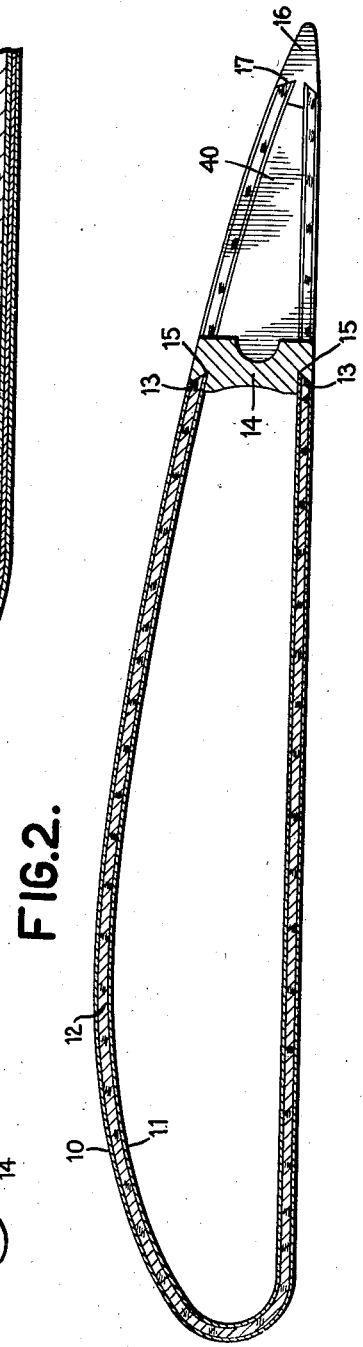
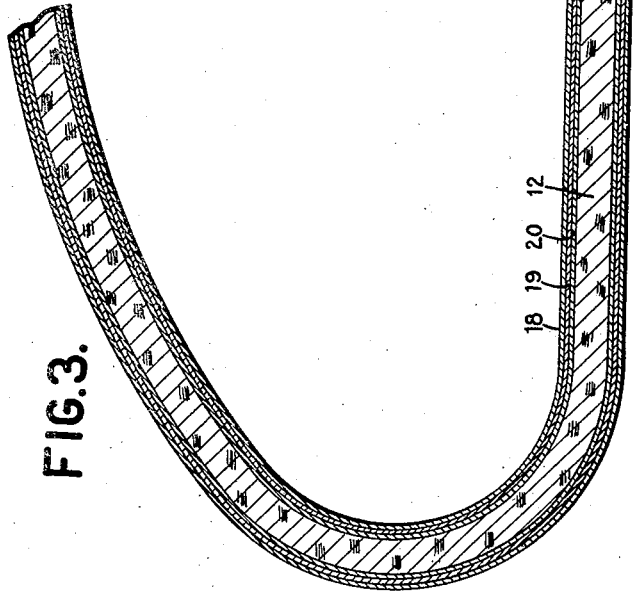
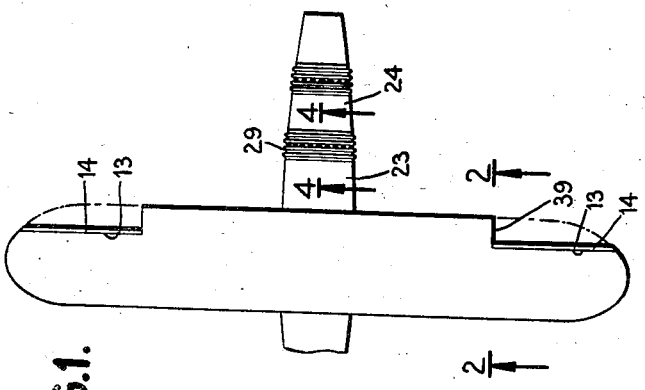
INVENTOR
ETIENNE MAUTNER
BY
ATTORNEY May 27, 1941.                    E. MAUTNER                    2,243,432
                                  AIRCRAFT
                             Filed Aug. 13, 1938                3 Sheets-Sheet 2
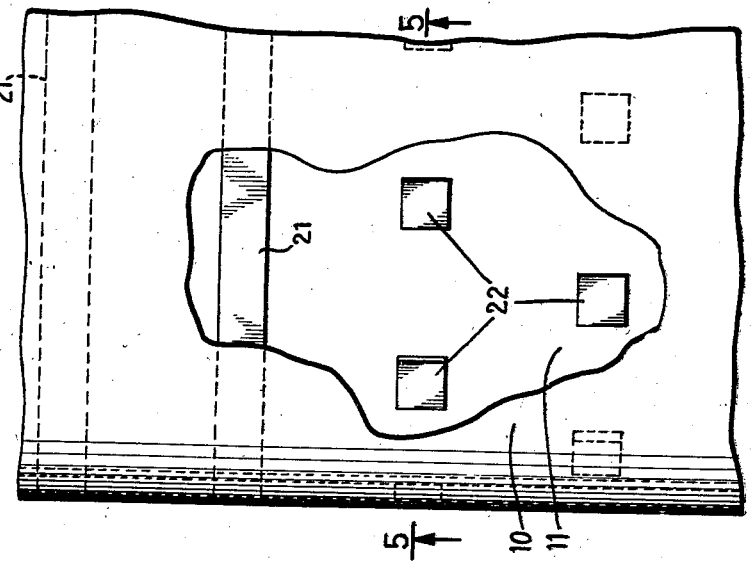
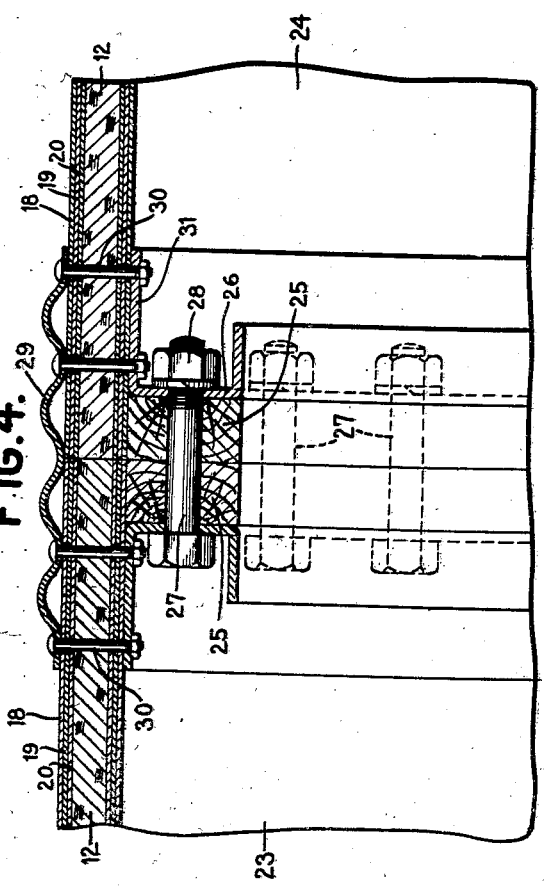
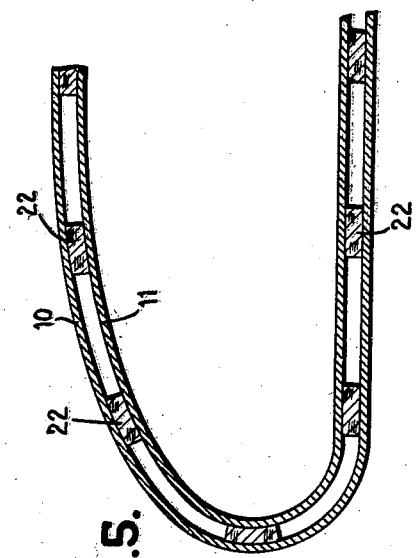
INVENTOR
*ETIENNE MAUTNER*
BY
*S. H. Chamberlain, Jr.*
ATTORNEY

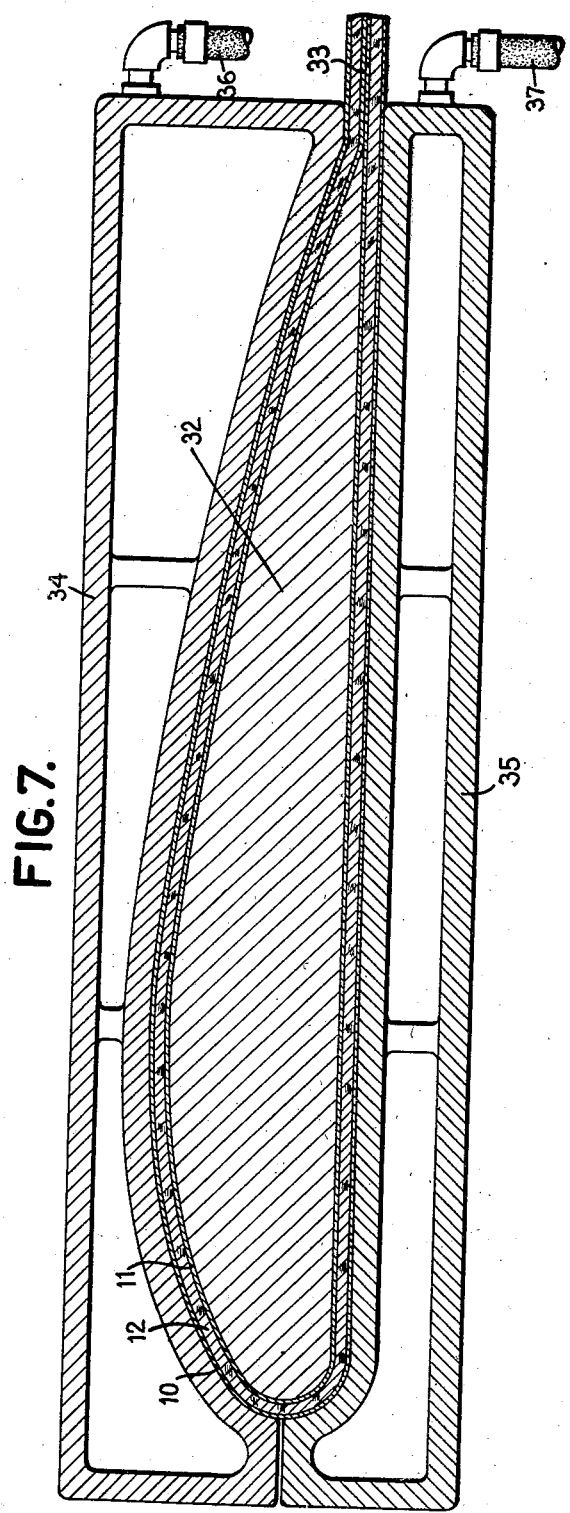

Patented May 27, 1941

2,243,432

UNITED STATES PATENT OFFICE 2,243,432

AIRCRAFT

Etienne Mautner, New York, N. Y., assignor to Skydyne Inc., New York, N. Y., a corporation of New York Application August 13, 1938, Serial No. 224,699

4 Claims. (Cl. 244—123)

This invention relates to improvements in aircraft and more particularly to the construction of wings of airplanes. Its objects are simplicity of construction, increased strength with minimum weight of the supporting structures, safety and comfort in operation, economy in space, durability and in general improved efficiency in operation.

Other objects of the present invention may be readily understood from an examination of the drawings in which like reference numerals designate like parts in the several sheets and in which:

Fig. 1 represents a general diagrammatic view of an airplane;

Fig. 2 is a section taken on line 2—2 of Fig. 1;

Fig. 3 is an enlarged portion of the wing structure;

Fig. 4 is a section taken on line 4—4 of Fig. 1;

Figs. 5 and 6 are sections showing a modification of the wing structure;

Fig. 7 is a section taken through a mold to show the manner of molding the wing structure.

The construction of the wings for airplanes heretofore has required the use of spars and braces or ribs within the wing structure over which has been placed a shell or skin of metal or fibrous material. Such a construction in general is expensive as the supporting members have to be assembled piece by piece with templates used for accurate alignment. Any inherent weakness or hidden flaw in one of the spars which might be caused from crystalline structure or impurities in the metal may cause the spar to break at that point, resulting in the collapse of the wing. Stresses exerted upon the wing in excess of the allowed load plus the factor of safety will cause the spars to break and the wings to break loose. Such excessive stresses may come from numerous causes, among which causes may be a too sudden "levelling off" after a power dive, or the accidental striking of the tip of the wing in making a landing or banking too close to the ground. The undesirability of relying on such a structure has been further shown in the use of airplanes in war where a wing may be riddled with machine gun bullets. If two or three such bullets hit one of the spars at vulnerable points, the spar is either broken directly or weakened to the extent that the manoeuvers to which a pursuit plane or combat plane is subject will cause stresses on the wing too great for the weakened supports to withstand, with the result that the plane is brought down due to wing failure.

The present invention eliminates the objections previously set forth and contemplates the use of a laminated material which may be plywood and cork as set forth in the preferred embodiment to be hereinafter explained. The use of such material for wing construction permits it to be molded quickly and comparatively inexpensively over a form which when completed, and the form withdrawn, leaves a complete wing structure ready for attachment to the fuselage in a suitable manner. The wing structure thus constructed is a hollow shell which is rigid within the required limits, but although rigid does not act in a brittle manner when such limits are exceeded but will distort slightly and resiliently if accidently struck at its tip in such instances of banking too close to the ground, or in the case of "levelling off" too quickly after a power dive, will bend slightly in a resilient manner to "spill" wind and thus ease the strain. One of its most valuable assets is its use for military purposes, such as for pursuit and combat planes, as the wings are considerably lighter and stronger than wings of similar size made of other materials supported by spars and braces, and the effect of machine gun fire on a wing of this type is practically harmless as the wing can be quite thoroughly perforated with bullets without weakening it to the breaking point as the support of the stresses imposed on such a wing is so evenly distributed over the surface: If small portions of the material are shot away by gun fire, the load on the wings automatically redistributes itself to a change in load per unit of area over the entire surface of the wing. It has been found from experiments that a wing of this construction is practically 100% free from vibration. This permits of attaining higher speeds since the tendency of the wing to vibrate increases with the speed and if a wing starts to vibrate it may cause loss of control of the plane and such vibration may cause the conventional spar supported wing to break off. Attempt to build wings of this type of laminations of metal have been impractical because of the excessive vibration of the wing and the noise incurred by such vibration.

The value of constructing a fuselage cabin or the hull of a hydroairplane by such a method may be readily seen because of these qualities of lightness and freedom of vibration and also because such material acts as insulation against temperature changes. The resiliency of such material against shock makes it a particularly useful construction for the hull of a hydroairplane which may hit a hidden floating object in the water. The absence of any cross-bracing within the enclosure of such structures makes it possible to utilize the additional space to advantage. The use of a plywood outer surface backed up by an insulating material tends to resist the formation of ice thereon.

Turning now to Figs. 1 and 2. Fig. 1 shows a schematic diagram of a conventional type of airplane but it is understood that any of the various types now in use, whether single or multi-wing plane, is equally adapted to this type of construction, and although a fuselage of circular cross-section is shown in the conventional diagram, it will be understood that any type whether of square or oval cross-section may be so constructed as well as the hull or cabin of a hydro-airplane.

In construction the wing, a hollow shell is formed by bending a laminated sheet of material over a form in a manner to be explained later to form a hollow shell as shown in Fig. 2. This laminated material may be made up of layers of plywood 10 and 11 with a layer of cork 12 disposed between them with the edges terminating at 13 in a block 14 to which the ailerons may be attached. These edges are cut at an angle and fit snugly into notches 15 and held there by suitable and well known adhesive materials. The trailing edge of the wing is formed by a V shaped block 16 in which notches 17 are provided to receive the converged edges of the laminated shell.

In order to avoid confusion and a multiplicity of lines in the drawings, the outer and inner layers as shown in Figs. 2, 5 and 7 are construed to be plywood made up of a plurality of layers of veneer which is shown in detail in the enlarged sections shown in Figs. 3 and 4 in which the outer and inner layers of plywood are shown to comprise a plurality of layers of veneer.

The plywood may be made up of a plurality of layers of veneer 18, 19, 20, leaving the grain of each alternate layer running at right angles to the other as shown in the enlarged view in Fig. 3. While the preferred embodiment, illustrated in the drawing, shows two layers of plywood with a layer of resilient material, preferably cork, between them, it may be understood that as many alternate layers of plywood and resilient material may be used as desired to produce a suitable strength of shell proportionate to the size of the wing to be constructed.

Figs. 5 and 6 shows a modification in the construction in which the resilient material disposed between the layers of plywood may be of various configurations such as strips as shown at 21 (Fig. 6) or squares as shown at 22 or any other configurations desired.

The construction of the fuselage may be made as a single unit, molding the laminations about a form, or it may be made in sections and joined together along the longitudinal axis of the fuselage. Such a method of joining the sections is illustrated in Fig. 4. Hollow shells 23 and 24 are formed of the laminated material previously described. For the purpose of the present description it will be assumed that these shells are circular in cross section. The end of each shell is provided with an annular stiffening member 25 fixed to the inner periphery of the shell and located at the ends thereof. This stiffener may be of wood or any other suitable light material. An annular channel ring 26 is disposed adjacent said stiffening member with the outer leg of said channel closely fitting the inner periphery of the shell. The ends of the shells are aligned in axial relation to form a butt joint with their stiffening members adjacent. Bolts 27 are inserted through the channel rings and stiffeners in spaced relationship around the circumference, and said bolts are secured by nuts 28, thus tightly securing the shells in alignment. To further stiffen the fuselage, these joints are spanned by a metal plate 29 which may be corrugated or plain. This plate is banded around the periphery and is held securely by bolts 30 which extend through the wall of the shell and through the outer leg 31 of the channel ring 26. These bolts are placed in suitable spaced relationship about the outer periphery. The sections are thus held rigidly together and yet may be readily replaced. The advantages of such a construction are particularly valuable in the construction of training planes in which the damage factor runs high. Such planes which are flown by novices are frequently broken. Particularly the nose section or the tail section is broken in landing. With the present construction it is only necessary to replace that particular section instead of the entire fuselage. Wings are frequently broken by novices in training and in the present construction a complete wing may be readily and quickly replaced. The advantage of being able to replace a wing or section of a fuselage is particularly desirable when planes are being used at a location that is remote from a factory or source of supply, as spare parts can be kept on hand to quickly and effectively replace broken sections.

Turning now to Fig. 7, the method of forming such structures will now be described and for this purpose the method used for constructing the wing will be explained. A form 32 is provided which may be made of any suitable material such as wood or metal. This form is made to the shape of the wing. Layers of veneer in a pliable condition are folded tightly around this form with their edges converging together. Suitable adhesive material may be placed between each layer and the veneer is placed on the form with the grain of alternate layers at right angles to the layers between. These successive layers form a plywood inner shell. A layer of resilient material is then placed around this plywood shell and said layer may be a continuous sheet of said material or separate pieces of various configurations spaced apart from each other as shown in the modification Figs. 5 and 6; another series of layers of veneer are then folded over the layer of resilient material to form an outer shell of plywood. The edges of all of the layers thus applied may extend outwardly as shown at 33. Outer molds 34 and 35 conforming to the exact curvature of the wing are then pressed against the form by any well known and suitable means, such as hydraulic pressure, to press the various layers under heavy pressure to conform exactly to the proper wing curvature and to produce a solid laminated shell. The mold is held in this position to allow the shell to set, which may be effected by various well known means. In the present embodiment hollow molds are used which may be connected to flexible steam lines 36 and 37, which are in turn connected to a suitable source of steam supply not shown. Steam is flowed into the hollow molds to heat them and to dry out the moisture that may exist from various causes and to set the laminated shell in its proper form. Any other suitable and well known means for "setting" the structure may be used. The outer and rearward edges of the wing now formed are substantially closed. The molds 34 and 35 are removed after the "set" is effected and the form 32 is withdrawn through the open inner end. The converging edges are then cut back and secured together to bring the rear and outer edges of the wing to a point. One method of doing this is shown in Fig. 2 where they are secured to the V shaped block 16 as previously described. To make room for a movable aileron, the rear and outward edges are cut further back and terminated and secured in a block 14 (Fig. 2). The opening along the edge 39 (Fig. 1) which will be left by cutting back the wing is closed by a flat member of wood or other suitable material 40 which is cut along its edges to conform to the inner curvature of the shell and is securely fastened therein.

While the invention as set forth in the preferred embodiment illustrated in the drawings has been described, explained and pointed out, it may be understood that alterations or changes departing from the illustrations set forth in the drawings and the specification may be made by those skilled in the art without departure from the spirit of the invention.

What I claim is:

1. An aircraft wing consisting of and relying for its strength and rigidity entirely on the combination of, a unitary multi-layer sheet comprising a pair of exterior veneer laminae separated by and glued to an interior layer of cellular hydrocarbonaceous material substantially lighter than wood inerposed between said pair, and of one train of solid wood members including members extending in a substantially spanwise direction disposed in rear relation to said sheet, said sheet having a pair of edges in rearward relation to the wing and in spaced relation to each other glued respectively to the upper and lower side of said train, said sheet and said train forming together a hollow forwardly well rounded wing structure closed in front, on top and on bottom by said sheet and closed rearwardly from tip to tip by said train, the wing including furthermore hinge means fastened to said train in rearward relation thereto adjacent the wing tips constructed and proportioned for the mounting of ailerons.

2. An aircraft wing consisting of and relying for its strength and rigidity entirely on the combination of, a uniformly thick unitary multi-layer sheet comprising a pair of exterior veneer laminae separated by and glued to an interior layer of cellular hydrocarbonaceous material substantially lighter than wood interposed between said pair, and of one train of solid wood members including members extending in a substantially spanwise direction disposed in rear relation to said sheet, said sheet having a pair of edges in rearward relation to the wing and in spaced relation to each other glued respectively to the upper and lower side of said train, said sheet and said train forming together a hollow forwardly well rounded wing structure closed in front, on top and on bottom by said sheet and closed rearwardly from tip to tip by said train, the wing including furthermore hinge means fastened to said train in rearward relation thereto adjacent the wing tips constructed and proportioned for mounting of ailerons.

3. An aircraft wing having a substantially straight leading edge consisting of and relying for its strength and rigidity entirely on the combination of, a unitary multi-layer sheet comprising a pair of exterior veneer laminae separated by and glued to an interior layer of cellular hydrocarbonaceous material substantially lighter than wood interposed between said pair, and of one train of solid wood members including members extending in a substantially spanwise direction disposed in rear relation to said sheet, said sheet having a pair of edges in rearward relation to the wing and in spaced relation to each other glued respectively to the upper and lower side of said train, said sheet and said train forming together a hollow forwardly well rounded structure closed in front, on top and on bottom by said sheet and closed rearwardly from tip to tip by said train, the wing including furthermore hinge means fastened to said train in rearward relation thereto adjacent the wing tips constructed and proportioned for the mounting of ailerons.

4. An aircraft wing consisting of and relying for its strength and rigidity entirely on the combination of, a uniformly thick unitary multi-layer sheet comprising a pair of exterior plywood laminae separated by and glued to an interior layer of cellular hydrocarbonaceous material substantially lighter than wood interposed between said pair, said interior layer being substantially thicker than either plywood layer, and of one train of solid wood members including members extending in a substantially spanwise direction disposed in rear relation to said sheet, said sheet having a pair of edges in rearward relation to the wing and in spaced relation to each other glued respectively to the upper and lower side of said train, said sheet and said train forming together a hollow forwardly well rounded wing structure closed in front, on top and on bottom by said sheet and closed rearwardly from tip to tip by said train, the wing including furthermore hinge means fastened to said train in rearward relation thereto adjacent the wing tips constructed and proportioned for mounting of ailerons.

ETIENNE MAUTNER.